United States Patent
Bouchy et al.

(10) Patent No.: US 7,316,538 B2
(45) Date of Patent: Jan. 8, 2008

(54) TURBINE ENGINE WITH AN UNCOUPLING DEVICE, UNCOUPLING DEVICE AND FUSIBLE SCREW FOR THE UNCOUPLING DEVICE

(75) Inventors: Gael Bouchy, La Chapelle Iger (FR); Regis Eugene Henri Servant, Vigneux S/Seine (FR)

(73) Assignee: SNECMA, Paris (FR)

( * ) Notice: Subject to any disclaimer, the term of this patent is extended or adjusted under 35 U.S.C. 154(b) by 247 days.

(21) Appl. No.: 11/256,935

(22) Filed: Oct. 25, 2005

(65) Prior Publication Data
US 2006/0087396 A1    Apr. 27, 2006

(30) Foreign Application Priority Data
Oct. 26, 2004   (FR)   .................... 04 52444

(51) Int. Cl.
*F02C 7/06*   (2006.01)
*F02C 7/00*   (2006.01)

(52) U.S. Cl. .............. 415/9; 415/229; 416/2; 411/916

(58) Field of Classification Search .......... 415/9, 415/229; 416/2, 174; 411/382, 916, 917; 403/2
See application file for complete search history.

(56) References Cited

U.S. PATENT DOCUMENTS 4,114,961 A   9/1978 Pithie
4,501,362 A   2/1985 Duncan
4,502,738 A   3/1985 Nauta
5,417,501 A   5/1995 Hyde et al.
2005/0117828 A1   6/2005 Bouchy et al.

FOREIGN PATENT DOCUMENTS

FR   2 473 938        7/1981
FR   2 752 024 A1     2/1998
FR   2 831 624 A1     5/2003
GB   2 067 655 A      7/1981

*Primary Examiner*—Edward K. Look
*Assistant Examiner*—Nathan Wiehe
(74) *Attorney, Agent, or Firm*—Oblon, Spivak, McClelland, Maier & Neustadt, P.C.

(57) ABSTRACT

The turbine engine of the invention includes a rotor with at least one bearing, mounted on a bearing supporting part, said part being connected to the fixed structure by an uncoupling device, including at least one fusible screw passing through at least one bore, said screw comprising a head and a threaded portion, a fusible portion forming a preferential failure area, located between the head of the screw and its threaded portion.

The screw comprises, between its threaded portion and its fusible portion, a portion for blocking the screw in rotation, cooperating with a complementary blocking portion provided in the bore. By means of the invention, the torsional torque related to the tightening of the screw is not transmitted to its fusible portion.

10 Claims, 4 Drawing Sheets

TURBINE ENGINE WITH AN UNCOUPLING DEVICE, UNCOUPLING DEVICE AND FUSIBLE SCREW FOR THE UNCOUPLING DEVICE

The invention relates to a turbine engine with an uncoupling device, an uncoupling device for the turbine engine and a fusible screw for the uncoupling device of the turbine engine.

A turbine engine comprises, from downstream to upstream, in the gas flow direction, a fan, one or more compressor stages, a combustion chamber, one or more turbine stages and a gas exhaust nozzle. The fan includes a rotor provided with blades at its periphery which, when they are set into rotation, drive the air into the turbojet engine. The fan rotor is supported by a drive shaft, which is centred on the axis of the turbojet engine by a series of bearings, supported by supporting parts connected to the fixed structure of the turbojet engine.

The failure of a fan blade may occur accidentally. There follows a large unbalance on the fan-driving shaft, which causes loads and vibrations on the bearings, transmitted by their supporting parts to the fixed structure of the turbojet engine, which should be dimensioned accordingly.

In order to be able to dimension the structure of the turbojet engine in a less cumbersome and less costly way, the prior art teaches, as for example, in patent FR 2,752,024, the provision of a system for uncoupling one or more bearings. The supporting part of a bearing is fixed to the structure of the turbojet engine by so-called fusible screws, including a weakened portion causing their failure in the case of too large tensile stresses. Thus, when unbalance appears on the drive shaft, the unbalanced stresses are converted at the fusible screws into longitudinal stresses by the supporting part of the bearing. If the stresses reach a determined threshold, the fusible screws break, uncoupling the supporting part from the first bearing of the structure of the turbojet engine, to which the unbalanced stresses are no longer transmitted by the bearing supporting part.

Such fusible screws comprise a head and a stem, with a threaded portion, so as to be attached by means of a nut, and a calibrated tapered portion forming the "fusible" portion of the screw, arranged between the head and the threaded portion. The screw allows the attachment of at least two parts; during assembly, the head is pressed against a first part and a nut is screwed in against the second part.

Calibration of the strength of the fusible area of the screw should be very accurate, so that the screw does not break during normal operation and certainly breaks in the event of predefined stresses. As tightening the nut may introduce a torsional torque in the screw, the end of the screw opposite to the head includes an impressed recess for insertion of a wrench by the operator in order to recapture the tightening torque.

However, it is found that the wrenches, housed in the impressed recess of the stem of the screw, considerably deform upon tightening, sometimes until they break. Now, it is impossible to provide larger wrenches, since the dimensions of the impressed recess are limited by the diameter of the stem.

Further, experience proves that the operators tend not to content themselves with blocking the stem in rotation, but to exert tightening of the screw by acting on both wrenches at a time, i.e., the wrench inserted at the end of the stem and the wrench for tightening the nut. Calibration of the tightening torque is then no longer observed. Now a too large tightening torque tends to plastically deform the screw, which alters the calibration of its fusible portion, whereas a too small tightening torque may be expressed by uncontrolled failures of the screw.

Finally, the torsional torque introduced by the tightening of the nut propagates in the screw, towards the threaded end into which the wrench is inserted on the one hand, towards the head on the other hand. The torsional torque propagating towards the head notably propagates into the fusible portion of the screw, which again is detrimental to its calibration.

The present invention is aimed at overcoming these drawbacks.

For this purpose, the invention relates to a turbine engine, comprising a rotor with at least one bearing, mounted on a bearing supporting part, said part being connected to the fixed structure by an uncoupling device, including at least one fusible screw, passing through at least one bore, said screw comprising a head and a threaded portion, a fusible portion forming a preferential failure area, located between the head of the screw and its threaded portion, characterized by the fact that said screw comprises, between its threaded portion and its fusible portion, a portion for blocking the screw in rotation cooperating with a complementary blocking portion provided in the bore.

By means of the invention, the screw is blocked in rotation by its rotation-blocking portion. It is therefore no longer necessary to use a wrench cooperating with an impressed recess of its stem. Further, the torsional torque exerted on the screw during the tightening of the nut is recaptured by the rotation-blocking portion and transmitted to the part including the complementary blocking portion; the torque is therefore not transmitted to the fusible portion which remains properly calibrated.

The invention also relates to an uncoupling device between a bearing supporting part and the fixed structure of a turbine engine, which comprises a rotor with at least one bearing mounted on said bearing supporting part, the device comprising at least one fusible screw, passing through at least one bore, said screw comprising a head and a threaded portion, a fusible portion forming a preferential failure area, located between the head of the screw and its threaded portion, characterized by the fact that said screw comprises, between its threaded portion and its fusible portion, a portion for blocking the screw in rotation, cooperating with a complementary blocking portion provided in the bore.

The invention also relates to a fusible screw for an uncoupling device between a bearing supporting part and the fixed structure of a turbine engine, which comprises a rotor with at least one bearing mounted on said bearing supporting part, the screw passing through at least one bore and comprising a head and a threaded portion, a fusible portion forming a preferential failure area, located between the head of the screw and its threaded portion, characterized by the fact that it comprises, between its threaded portion and its fusible portion, a rotation-blocking portion arranged in order to cooperate with a complementary blocking portion provided in the bore.

The invention will be better understood with the help of the following description of the turbojet engine, the uncoupling device and the fusible screw of the invention, with reference to the appended drawings, wherein.

Figure 1:
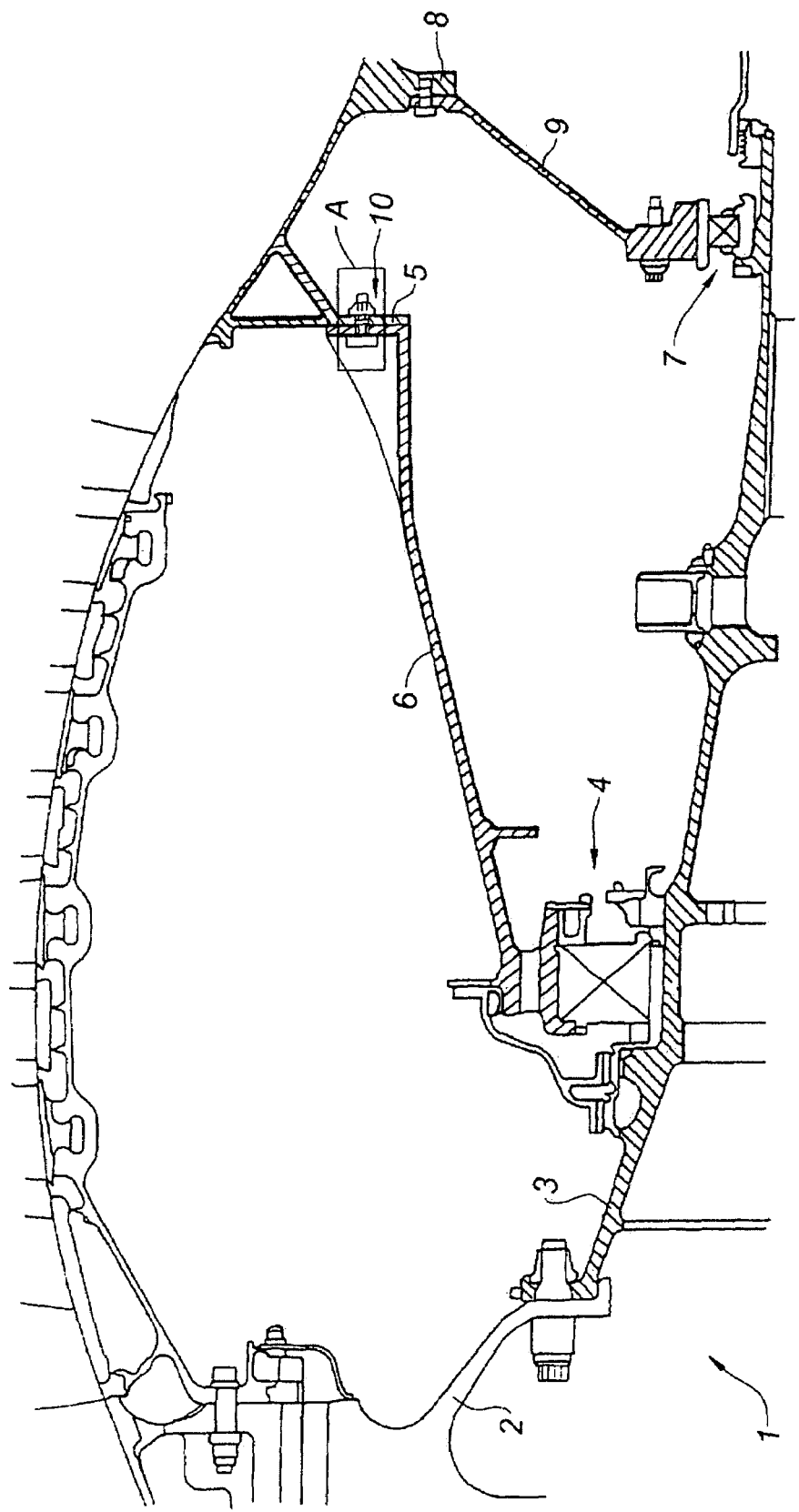
FIG. 1 illustrates a schematic axial sectional view of the turbojet engine of the invention.

With reference to FIG. 1, the turbojet engine 1 of the invention comprises a rotor 2, called a fan 2, fixed on a drive shaft 3 which drives it into rotation around the axis 1' of the turbojet engine. This shaft 3 is supported here by a first bearing 4, connected to a first flange 5 of the fixed structure of the turbojet engine 1 by a first bearing supporting part 6, called the first bearing support 6 hereafter, and a second bearing 7 connected to a second flange 8 of the fixed structure of the turbojet engine 1 by a second bearing supporting part 9, called the second bearing support 9 hereafter. The first bearing support 6 is attached to the first flange 5 by a plurality of longitudinal fusible screws 10, one of which will now be described.

Figure 2:
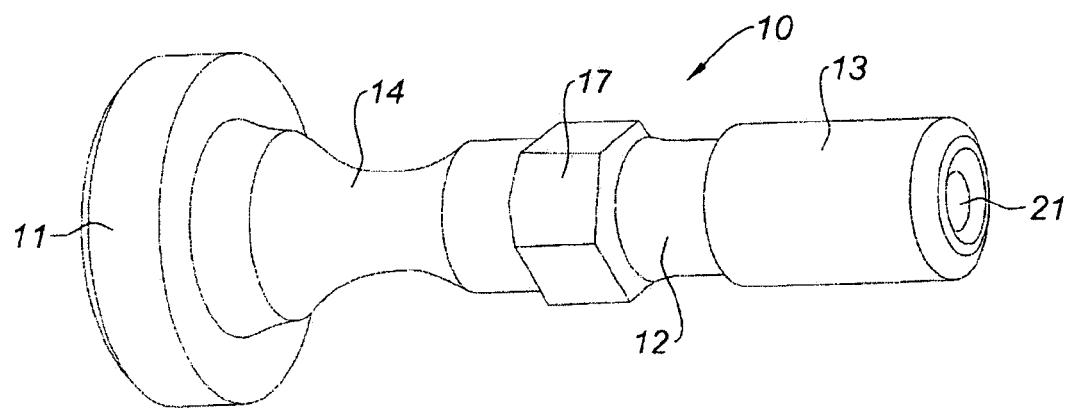
FIG. 2 illustrates a schematic perspective view of a first embodiment of the fusible screw of the invention, which is the screw of FIGS. 1 and 9.

With reference to FIG. 2, the fusible screw 10 includes a head and a stem 12. Opposite to the head 11, the stem 12 comprises a threaded portion 13, the thread of which is not shown in this case, intended to cooperate with a nut. Near the head 11, the screw 10 includes a fusible portion 14, forming a preferential tensile failure area. The fusible portion 14 is obtained here by gradually reducing the diameter of the stem 12. This tapered portion 14 is less resistant to tension than the remainder of the stem and is calibrated so as to break under the effect of a determined tensile force.

Figure 9:
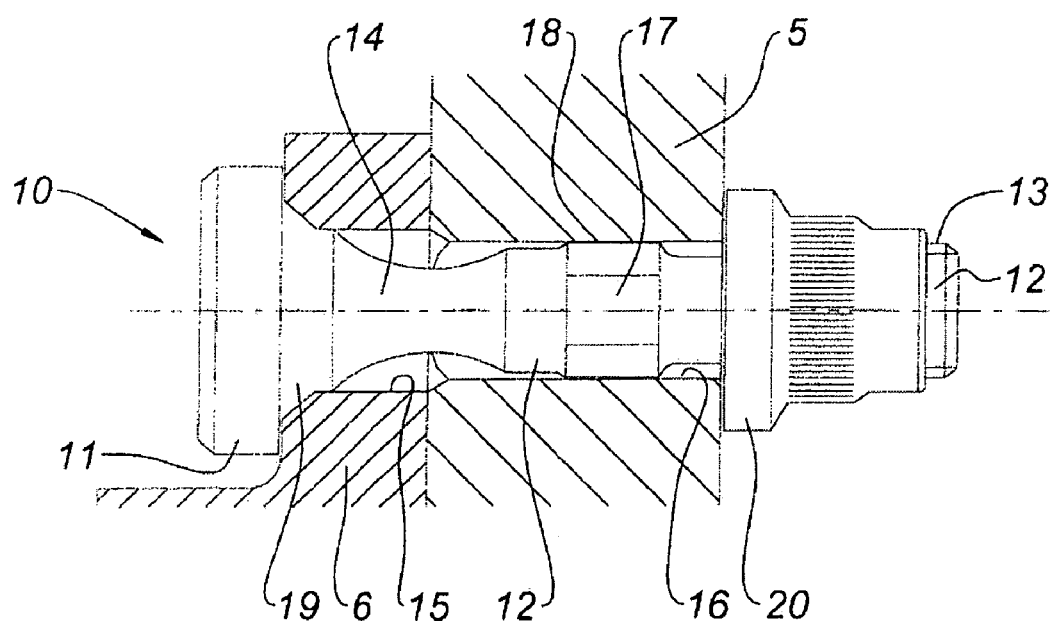
FIG. 9 illustrates a schematic profile sectional view of the area A of the turbojet engine of FIG. 1.

With reference to FIG. 9, the first bearing support 6 and the first flange 5 of the fixed structure of the turbojet engine 1 each include a bore 15, 16, respectively, for letting through the fusible screw 10. Thus, the fusible screw 10 is able to participate in the attachment of the first bearing support 6 against the first flange 5.

The fusible screw 10 includes, between its fusible portion 14 and its threaded portion 13, a rotation-blocking portion 17, intended to cooperate with a complementary blocking portion 18 provided in the bore 16 of the first flange 5. In the embodiment of FIG. 2, the rotation-blocking portion 17 is a portion with a polygonal, here hexagonal, section, i.e., a portion, the external surface of which forms the faces of a right prism with a hexagonal base. The maximum external diameter of this blocking portion is here maximum, relatively to the set of external diameters of the stem 12 between its fusible portion 14 and its threaded portion 13.

The bore 16 of the first flange 5 is also with a hexagonal section in its complementary blocking portion 18, which represents at least one portion of its length into which the screw 10 is caused to slide during its mounting, in order to receive the blocking portion 17 of the screw 10, with a slight play required for mounting.

The mounting of the fusible screw 10, in order to secure the first bearing support 6 and the first flange 5 will now be explained with reference to FIG. 9.

The first bearing support 6 is applied against the first flange 5, so that their bores 15, 16 for receiving the screw 10, are coaxial. In this specific case, the diameter of the bore 15 of the first bearing support 6 is larger than the diameter of the first flange 5. The screw 10 with its threaded end 13, is inserted, from the free aperture of the bore 15 of the first bearing support 6, until its head 11 presses against the free face of the first bearing support 6, around the aperture of its bore 15. The rotation-blocking portion 17 of the screw 10 may pass through into the bore 15 of the first bearing support 6, because the diameter of the latter is larger than that of the blocking portion 17, into the bore 16 of the first flange 5, because of the shape of the complementary blocking portion 18 of this bore 16 in which the blocking portion 17 may slide, provided that the screw 10 is properly and angularly orientated by the operator.

In this special case, the screw 10 comprises, adjacent to its head 11, a centering portion 19 with a diameter matching that of the bore 15 of the first bearing support 6 in which it will be housed.

The thereby positioned screw 10 is blocked in rotation by its blocking portion 17 housed in the complementary blocking portion 18 provided in the bore 16 of the first flange 5. The operator then adds a nut 20 which is screwed by means of a wrench onto the threaded portion 13 of the screw 10, protruding out of the bore 16 of the first flange 5. The torsional torque induced by the tightening of the nut 20 is recaptured by the rotation-blocking portion 17 of the screw 10 and transmitted to the first flange 5 at the faces of its complementary blocking portion 18, against which the faces of the blocking portion 17 are pressed.

By means of the invention, tightening of the nut 20 on the screw 10 is carried out without the assistance of an extra wrench, the screw 10 being blocked in rotation, so that all the drawbacks related to it may be eliminated. Further, no torsional torque is introduced into the fusible portion 14 of the screw 10, as the torsional torque is recaptured by the first flange S at the blocking portion 17 of the screw 10, located between its threaded end 13 and its fusible portion 14.

The presence of a blind bore 21 at the end of the stem 12 of the screw 10 may be noticed in FIG. 2; in fact this is the impressed recess of the centre or back centre used for making the screw 10.

The first bearing support 6 is mounted against the first flange 5 by a plurality of fusible screws 10 similar to the one which has just been described. Thus, for example in the case of failure of a blade of the fan 2 during the operation of the turbojet engine 1, unbalance results on its drive shaft 3, which is expressed at the fusible screws 10 by tensile stresses, transmitted through the bearing support 6 which convert the radial unbalance into longitudinal stresses. If the unbalance is too large, the fusible screws 10 break in their fusible portion 14 and provide uncoupling of the first bearing 4 relatively to the fixed structure of the turbojet engine 1, preventing in this way transmission of the unbalance related stresses to this structure. In this specific case, it is seen that no uncoupling device is provided between the second bearing support 9 and the second flange 8.

There are other possible embodiments of the fusible screw of the invention, some of which will now be described. The differences between these embodiments relate to the shape of the rotation-blocking portion. Any other shape may be contemplated, as long as it provides a function for cooperating with a complementary blocking portion provided in a bore of one of the parts crossed by the screw in order to block the latter in rotation.

Figure 3:
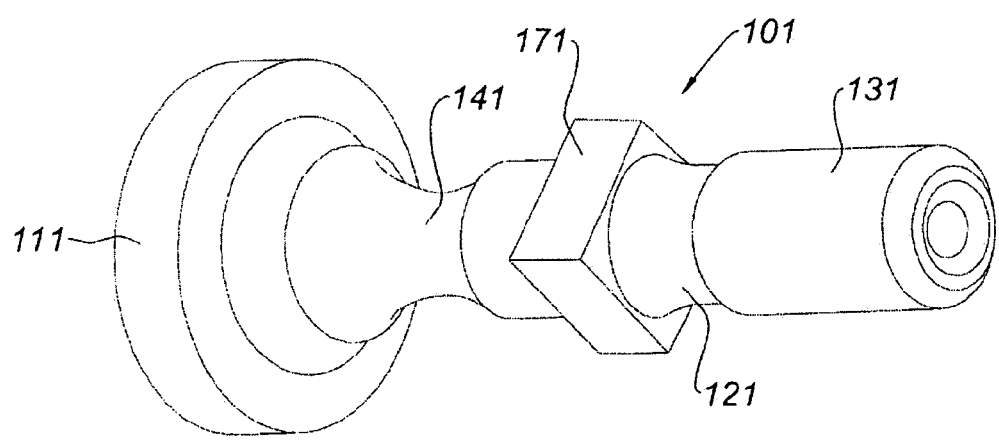
FIG. 3 illustrates a schematic perspective view of a second embodiment of the fusible screw of the invention.

With reference to FIG. 3, according to a second embodiment, the fusible screw 101 includes a head 111 and a stem 121. Opposite to the head 111, the stem 121 comprises a threaded portion 131, the thread of which is not shown in this case, intended to cooperate with a nut. Near the head 111, the screw 101 includes a fusible portion 141, forming a preferential tensile failure area, obtained here by gradually reducing the diameter of the stem 121. The fusible screw 101 includes, between its fusible portion 141 and its threaded portion 131, a rotation-blocking portion 171 intended to come and cooperate with a complementary blocking portion provided in a bore of one of the parts which the fusible screw 101 is intended to secure. The rotation blocking portion 171 is a portion with a polygonal, here square, section, i.e., a portion with the external surface forming the faces of a right prism with a square base. The maximum external diameter of this blocking portion is maximum here relatively to the set of external diameters of the stem 101 between its fusible portion 141 and its threaded portion 131.

Figure 4:
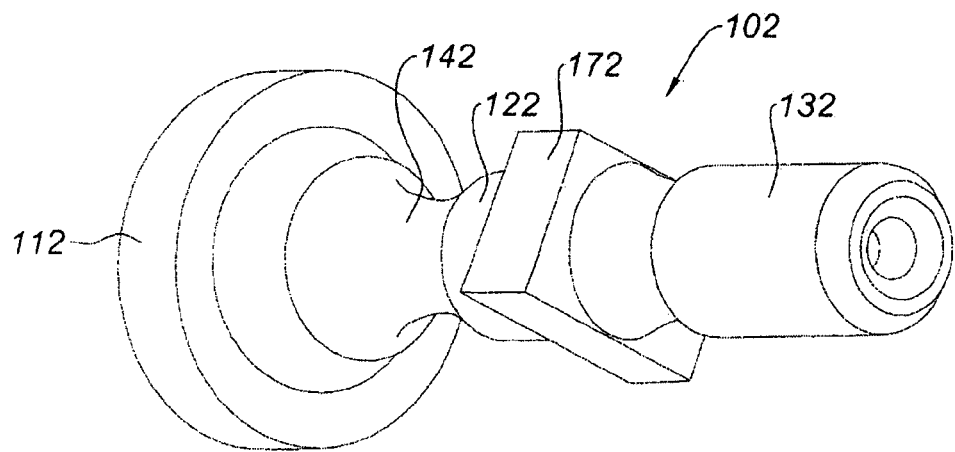
FIG. 4 illustrates a schematic perspective view of a third embodiment of the fusible screw of the invention.

With reference to FIG. 4, according to a third embodiment, the fusible screw 102 includes a head 112 and a stem 122. Opposite to the head 112, the stem 122 comprises a threaded portion 132, the thread of which is not shown in this case, intended to cooperate with a nut. Near the head 112, the screw 102 includes a fusible portion 142, forming a preferential tensile failure area, obtained here by gradually reducing the diameter of the stem 122. The fusible screw 102 includes, between its fusible portion 142 and its threaded portion 132, a rotation-blocking portion 172 intended to cooperate with a complementary blocking portion provided in a bore of one of the parts which the fusible screw 102 is intended to secure. The rotation-blocking portion 172 is a portion with a polygonal, here rectangular, section, i.e., a portion with the external surface forming the faces of a right prism with a rectangular base. The maximum external diameter of this blocking portion is maximum here relatively to the set of external diameters of the stem 102 between its fusible portion 142 and its threaded portion 132.

Figure 5:
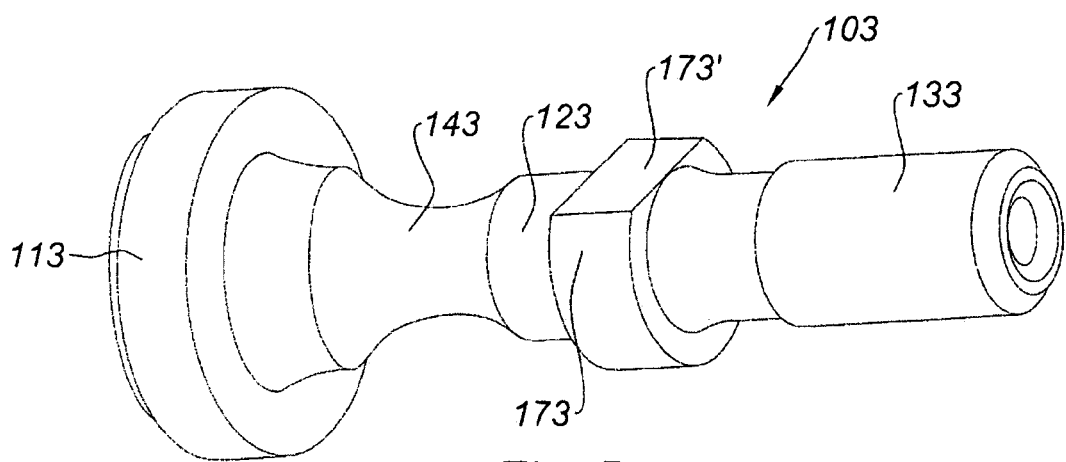
FIG. 5 illustrates a schematic perspective view of a fourth embodiment of the fusible screw of the invention.

With reference to FIG. 5, according a fourth embodiment, the fusible screw 103 includes a head 113 and a stem 123. Opposite the head 113, the stem 123 comprises a threaded portion 133, the thread of which is not shown in this case, intended to cooperate with a nut. Near the head 113, the screw 103 includes a fusible portion 143, forming a preferential tensile failure area, obtained here by gradually reducing the diameter of the stem 123. The fusible screw 103 includes, between its fusible portion 143 and its threaded portion 133, a rotation-blocking portion 173, intended to cooperate with a complementary blocking portion provided in a bore of one of the parts which the fusible screw 103 is intended to secure. The rotation-blocking portion 173 is here a portion with a cylindrical shape, the diameter of which is maximum here, relatively to the set of external diameters of the stem 103 between its fusible portion 143 and its threaded portion 133, the surface of this cylindrical portion including a flat spot 173'. It is this flat spot 173' which provides the rotation-blocking function of the blocking portion 173, by cooperating with a flat spot in the complementary blocking portion provided in the bore of the part receiving it.

Figure 6:
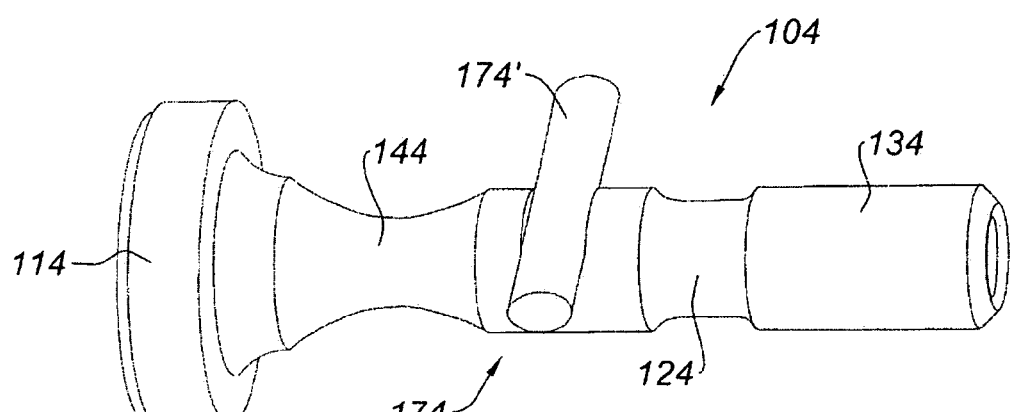
FIG. 6 illustrates a schematic perspective view of a fifth embodiment of the fusible screw of the invention.

With reference to FIG. 6, according a fifth embodiment, the fusible screw 104 includes a head 114 and a stem 124. Opposite the head 114, the stem 124 comprises a threaded portion 134, the thread of which is not shown in this case, intended to cooperate with a nut. Near the head 114, the screw 104 includes a fusible portion 144, forming a preferential tensile failure area, obtained here by gradually reducing the diameter of the stem 124. The fusible screw 104 includes, between its fusible portion 144 and its threaded portion 134, a rotation-blocking portion 174, intended to come and cooperate with a complementary blocking portion provided in a bore of one of the parts which the fusible screw 104 is intended to secure. The rotation-blocking portion 174 is here a portion with a cylindrical shape, including a stem 174' tangentially added onto its surface, in a housing provided for this purpose. The transverse dimensions of the added stem 174' are here larger than the set of external diameters of the stem 104 between its fusible portion 144 and its threaded portion 134. The portion of the added stem 174' protruding out of the stem 124 of the screw 104 is in this specific case, intended to be received in a groove provided for this purpose in the bore of the part receiving it.

Figure 7:
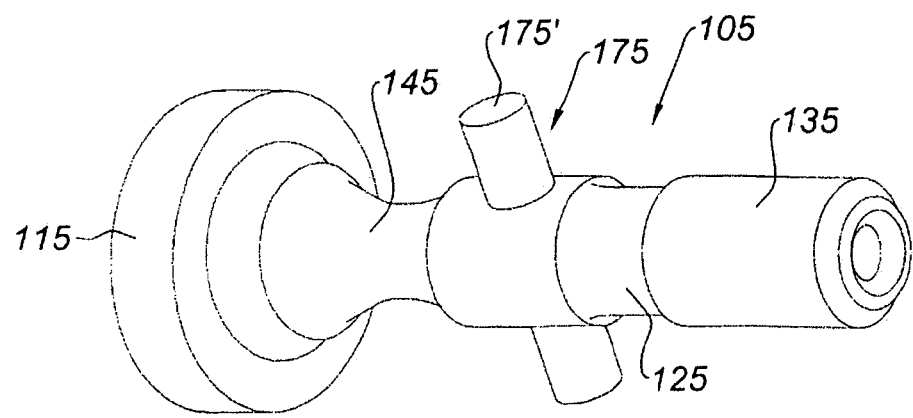
FIG. 7 illustrates a schematic perspective view of a sixth embodiment of the fusible screw of the invention.

With reference to FIG. 7, according a sixth embodiment, the fusible screw 105 includes a head 115 and a stem 125. Opposite the head 115, the stem 125 comprises a threaded portion 135, the thread of which is not shown in this case, intended to cooperate with a nut. Near the head 115, the screw 105 includes a fusible portion 145, forming a preferential tensile failure area, obtained here by gradually reducing the diameter of the stem 125. The fusible screw 105 includes, between its fusible portion 145 and its threaded portion 135, a rotation-blocking portion 175, intended to come and cooperate with a complementary blocking portion provided in a bore of one of the parts which the fusible screw 105 is intended to secure. The rotation-blocking portion 175 is here a portion with a cylindrical shape, including a stem 175' which passes through it, in a housing provided for this purpose. The transverse dimensions of the added stem 175' are here larger than the set of external diameters of the stem 105 between its fusible portion 145 and its threaded portion 135. The end of the added stem 175' protruding out of the stem 125 of the screw 105 are intended to be received in two grooves provided for this purpose in the bore of the part receiving it.

Figure 8:
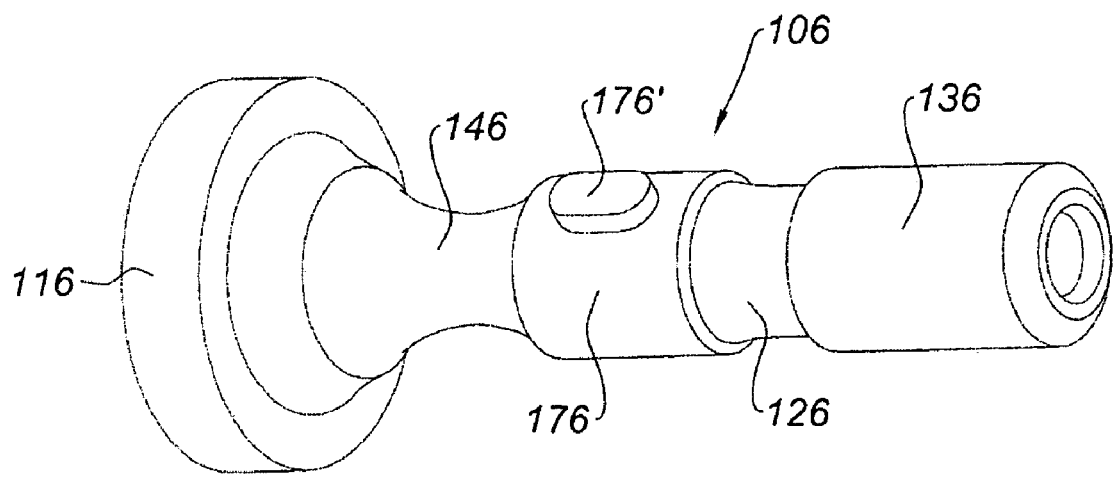
FIG. 8 illustrates a schematic perspective view of a seventh embodiment of the fusible screw of the invention.

With reference to FIG. 8, according a seventh embodiment, the fusible screw 106 includes a head 116 and a stem 126. Opposite the head 116, the stem 126 comprises a threaded portion 136, the thread of which is not shown in this case, intended to cooperate with a nut. Near the head 116, the screw 106 includes a fusible portion 146, forming a preferential tensile failure area, obtained here by gradually reducing the diameter of the stem 126. The fusible screw 106 includes, between its fusible portion 146 and its threaded portion 136, a rotation-blocking portion 176, intended to come and cooperate with a complementary blocking portion provided in a bore of one of the parts which the fusible screw 106 is intended to secure. The rotation-blocking portion 176 is here a portion with a cylindrical shape, including a protruding key 176' on its surface, received in a housing provided for this purpose. The transverse dimensions of the blocking portion 176 at the key 176' are here larger than the set of external diameters of the stem 106 between the fusible portion 146 and its threaded portion 136. The portion of the key 176' protruding out of the stem 126 of the screw 106 is intended to be received in a groove provided for this purpose in the bore of the part receiving it.

The fusible screw of the invention has been described, in its different embodiments, with a fusible portion obtained by tapering of its section; any other geometry may be contemplated, as long as it provides a breaking function in the event of determined stresses.

Further, the invention was described in connection with a turbojet engine, but it applies to any turbine engine, including an uncoupling device for at least one bearing of the drive shaft of its rotor with fusible screws, moreover, regardless of the parts connected with the fusible screws. The fusible screws may notably connect, in addition to a supporting part of the bearing and a part of the fixed structure of the turbine engine, other parts of the turbojet engine, for example a supporting part of another bearing, the fusible screws exerting in this case an uncoupling function for two bearings.

In any case, the part including the bore in which is provided a blocking portion complementary to the blocking portion of the screw of the invention, may be any part which is crossed by the screw, i.e., either the bearing support or the part of the fixed structure of the turbine engine to which it is attached, or another part crossed by the screw.

The complementary blocking portion provided in a bore may be directly adjacent to the bore as in the described embodiments wherein one is dealing with a different section of the bore or with grooves provided on its walls, but one may also be dealing with any structure completing the blocking portion of the screw. For example, one may be dealing with a drilled hole, passing through the bore, in which a stem forming the blocking portion of the screw will be inserted.

The invention claimed is:

1. A fusible screw for an uncoupling device between a bearing support part and the fixed structure of a turbine engine, which comprises a rotor with at least one bearing mounted on said bearing supporting part, the screw passing through at least one bore and comprising a head and a threaded portion, a fusible portion forming a preferential failure area, located between the head of the screw and its threaded portion, wherein it comprises, between its threaded portion and its fusible portion, a rotation-blocking portion arranged for cooperating with a complementary blocking portion provided in the bore.

2. The fusible screw according to claim 1, the blocking portion of which has a polygonal section.

3. The fusible screw according to claim 1, the blocking portion of which has a cylindrical shape with a flat spot.

4. The fusible screw according to claim 1, the blocking portion of which is cylindrical with a stem tangentially added onto its surface.

5. The fusible screw according to claim 1, the blocking portion of which is cylindrical with a stem passing through it.

6. The fusible screw according to claim 1, the blocking portion of which is cylindrical with a key protruding out of its surface.

7. An uncoupling device between a bearing supporting part and the fixed structure of a turbine engine, which comprises a rotor with at least one bearing mounted on said bearing supporting part, the device comprising at least one fusible screw, passing through at least one bore, said screw comprising a head and a threaded portion, a fusible portion forming a preferential failure area, located between the head of the screw and its threaded portion, wherein said screw comprises, between its threaded portion and its fusible portion, a portion for blocking the screw in rotation cooperating with a complementary blocking portion provided in the bore.

8. A turbine engine, comprising a rotor with at least one bearing, mounted on a bearing supporting part, said part being connected to the fixed structure by an uncoupling device, including at least one fusible screw, passing through at least one bore, said screw comprising a head and a threaded portion, a fusible portion forming a preferential failure area, located between the head of the screw and its threaded portion, wherein said screw comprises, between its threaded portion and its fusible portion, a portion for blocking the screw in rotation cooperating with a complementary blocking portion provide in the bore.

9. The turbine engine according to claim 8, wherein the complementary blocking portion is provided in a bore of the bearing supporting part.

10. The turbine engine according to claim 8, wherein the complementary blocking portion is provided in a bore of a part of the fixed structure of the turbine engine.

* * * * *